(12) United States Patent  (10) Patent No.: US 7,681,718 B2
Stebnicki et al.  (45) Date of Patent: Mar. 23, 2010

(54) MODULAR BELT LINK HAVING A DETACHABLY FIXED REINFORCEMENT LINK

(75) Inventors: James C. Stebnicki, Glendale, WI (US); Kevin S. Hansen, Grafton, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 637 days.

(21) Appl. No.: 11/611,392

(22) Filed: Dec. 15, 2006

(65) Prior Publication Data

US 2008/0142342 A1 Jun. 19, 2008

(51) Int. Cl.
*B65G 17/06* (2006.01)

(52) U.S. Cl. .................. 198/851; 198/850; 198/852; 198/853

(58) Field of Classification Search .......... 198/850–853
See application file for complete search history.

(56) References Cited

U.S. PATENT DOCUMENTS

| 2,564,533 | A | | 8/1951 | Imse |
| 4,114,467 | A | | 9/1978 | Petershack |
| 4,186,617 | A | * | 2/1980 | Avramidis et al. .......... 474/229 |
| 4,711,346 | A | * | 12/1987 | Breher et al. ................ 198/850 |
| 5,377,819 | A | | 1/1995 | Horton et al. |
| 5,469,956 | A | | 11/1995 | Greve et al. |
| 5,497,874 | A | | 3/1996 | Layne |
| 5,934,448 | A | | 8/1999 | Kucharski et al. |
| 6,073,756 | A | * | 6/2000 | Damkjær et al. ............ 198/853 |
| 6,079,552 | A | | 6/2000 | Reichert et al. |
| 6,089,379 | A | | 7/2000 | Hindi |
| 6,161,685 | A | | 12/2000 | Stebnicki |
| 6,202,834 | B1 | * | 3/2001 | Layne et al. ................. 198/852 |
| 6,629,596 | B2 | * | 10/2003 | Teuber ........................ 198/850 |
| 6,758,328 | B2 | * | 7/2004 | Arai et al. .................... 198/852 |
| 6,948,613 | B2 | | 9/2005 | Guldenfels et al. |
| 7,255,227 | B2 | * | 8/2007 | Melancon .................... 198/853 |
| 7,377,380 | B2 | * | 5/2008 | Menke et al. ............... 198/851 |
| 7,559,421 | B1 | * | 7/2009 | McDaniel et al. ........... 198/820 |

FOREIGN PATENT DOCUMENTS

| EP | 0916598 A | 5/1999 |
| GB | 1298231 A | 11/1972 |

OTHER PUBLICATIONS

Sander Hansen, Products Pasteurisation Technology, Oct. 4, 2005.
Series 6390-6391-6392 Pitch 50 Chains, Rexnord EU Mat Top Catalog, 2002.

* cited by examiner

*Primary Examiner*—Douglas A Hess
(74) *Attorney, Agent, or Firm*—Quarles & Brady LLP

(57) ABSTRACT

A conveyor assembly includes a module having a detachably fixed reinforcement link to simplify modular conveyor assembly, disassembly, and repair. The module includes a first link end extending in a first direction from a leading edge and a second link end extending in a second direction from a trailing edge. The first link end includes a first aperture for receiving a first link pin connecting the module to an adjacent module. The second link end includes a second aperture for receiving a second link pin connecting the module to another adjacent module. A reinforcement link is detachably fixed to the module. The reinforcement link includes a third aperture aligned with the first aperture for receiving the first link pin. And, the reinforcement link includes a fourth aperture aligned with the second aperture for receiving the second link pin.

19 Claims, 5 Drawing Sheets

MODULAR BELT LINK HAVING A DETACHABLY FIXED REINFORCEMENT LINK

CROSS REFERENCES TO RELATED APPLICATIONS

Not Applicable.

STATEMENT REGARDING FEDERALLY SPONSORED RESEARCH

Not Applicable.

FIELD OF THE INVENTION

The present invention relates generally to modular conveyor belts and chains, and more particularly to a module having a detachably fixed reinforcement link.

BACKGROUND OF THE INVENTION

Modular conveyor belts and chains are routinely used in various industries to aid in the transportation of parts and products. Modular belting and chains comprise adjacent modules interconnected to each other at link ends. Generally, one link end extends from a leading edge and another link end extends from a trailing edge of a module. The leading and trailing link ends contain apertures formed therethrough to accommodate link pins. The leading edge of one module meshes with the trailing edge of an adjacent module to allow a link pin to be coaxially inserted into the adjacent link end apertures. Numerous modules can be connected in this fashion until the desired conveyor belt assembly is formed. The conveyor belt is supported by a conveyor frame or boom and a drive pulley is used to advance the conveyor belt along a combination of slider beds and idler pulleys.

A conveyor belt or chain is under stress and tension during operation. The weight of the modules, the weight of product being transported, the friction between the modules and the bearing surfaces, and thermodynamic changes, among other factors, combine to create stress and tension in the conveyor belt or chain. Reinforcement links are placed in-line with the modules to better manage the stresses and maintain the dimensional stability and accuracy of each module, and therefore, the overall conveyor assembly.

Reinforcement links have been incorporated into modules in several ways. One method requires that the reinforcement link be an integrated part of the module. This can be accomplished, for example, by comolding the reinforcement link within a plastic module. Another method simply places reinforcement links in-line with the modules, such that, as the overall belt tension increases, the reinforcement links carry an increasing amount of the tension thus preventing the modules from undergoing significant deformation.

These two methods of managing the stress present several practical problems of assembly and repair. By comolding the reinforcement links with the modules, the cost of the modules increases and when a module becomes damaged, the integral reinforcement link must either be discarded or removed with substantial effort.

The use of in-line reinforcement links, while reducing the recovery issues presented by comolding, introduces significant problems during the initial assembly or subsequent repair of a modular conveyor belt system. As previously discussed, conveyor belt assemblies are comprised of numerous modules having intermeshing link ends that are connected together by a hinge pin. To assemble the conveyor, all of the link ends must be meshed, the reinforcement links held in alignment with the link ends, and a hinge pin must then be inserted through the resulting assembly at the link ends. This process becomes increasingly challenging as the width of the conveyor belt increases, often to multiple feet.

Aligning all of the pieces of a conveyor belt assembly can be quite cumbersome. The reinforcement links present the most difficulties as they are easily moved out of alignment. The frustrations are amplified when a conveyor belt is taken off line and a technician is needed to replace a damaged module—the conveyor sits idle, unrestrained reinforcement links fall to the floor, parts move out of alignment, and the technician begins to sweat.

SUMMARY OF THE INVENTION

The present invention provides a conveyor assembly including a module having a detachably fixed reinforcement link to simplify and improve modular conveyor assembly, disassembly, and repair. The module includes a first link end extending in a first direction from a leading edge and a second link end extending in a second direction from a trailing edge. The first link end includes a first aperture for receiving a first link pin connecting the module to an adjacent module. The second link end includes a second aperture for receiving a second link pin connecting the module to another adjacent module. A reinforcement link is detachably fixed to the module. The reinforcement link includes a third aperture aligned with the first aperture for receiving the first link pin. And, the reinforcement link includes a fourth aperture aligned with the second aperture for receiving the second link pin.

A general objective of the present invention is to provide a belt module and a modular conveyor assembly formed therefrom that is economically and easily assembled, disassembled, and repaired. This objective is accomplished by providing a module including a reinforcement link that is detachably fixed thereto.

This and other objectives and advantages of the present invention will be apparent from the description that follows. In the following detailed description, preferred embodiments of the invention are described with reference to the accompanying drawings. These preferred embodiments do not represent the full scope of the invention; rather, the invention may be employed in other embodiments. Reference should therefore be made to the claims herein for interpreting the breadth of the invention.

DETAILED DESCRIPTION OF PREFERRED EMBODIMENTS

Figure 1:
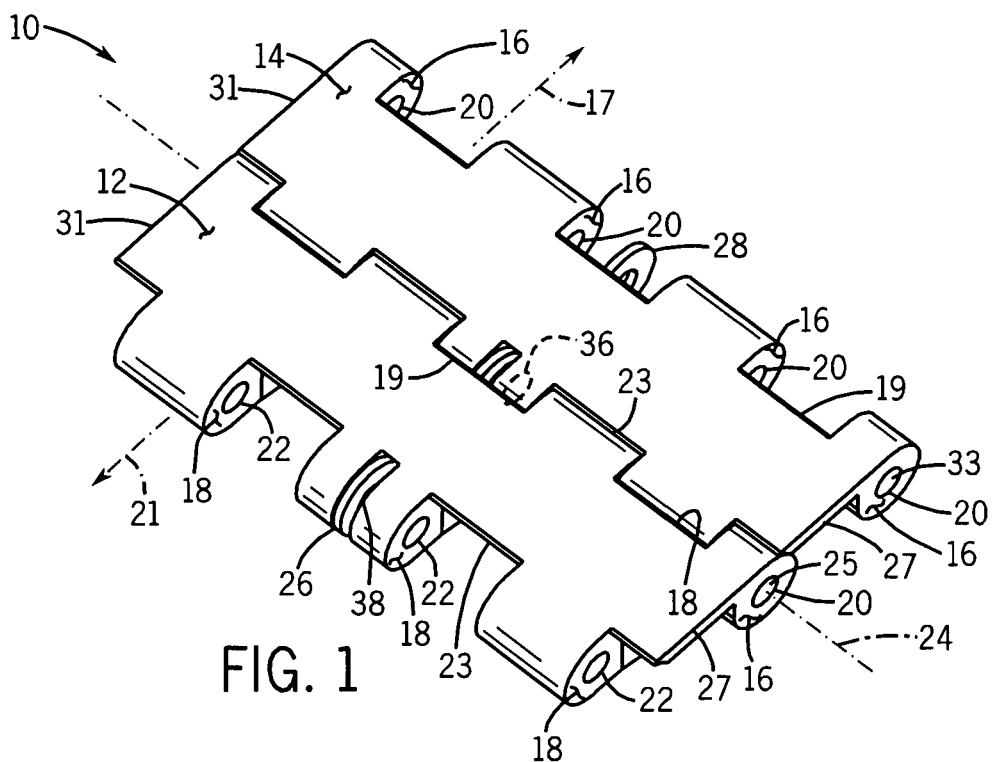
FIG. 1 is a top perspective view of a portion of a modular conveyor in accordance with a first embodiment.
Figure 2:
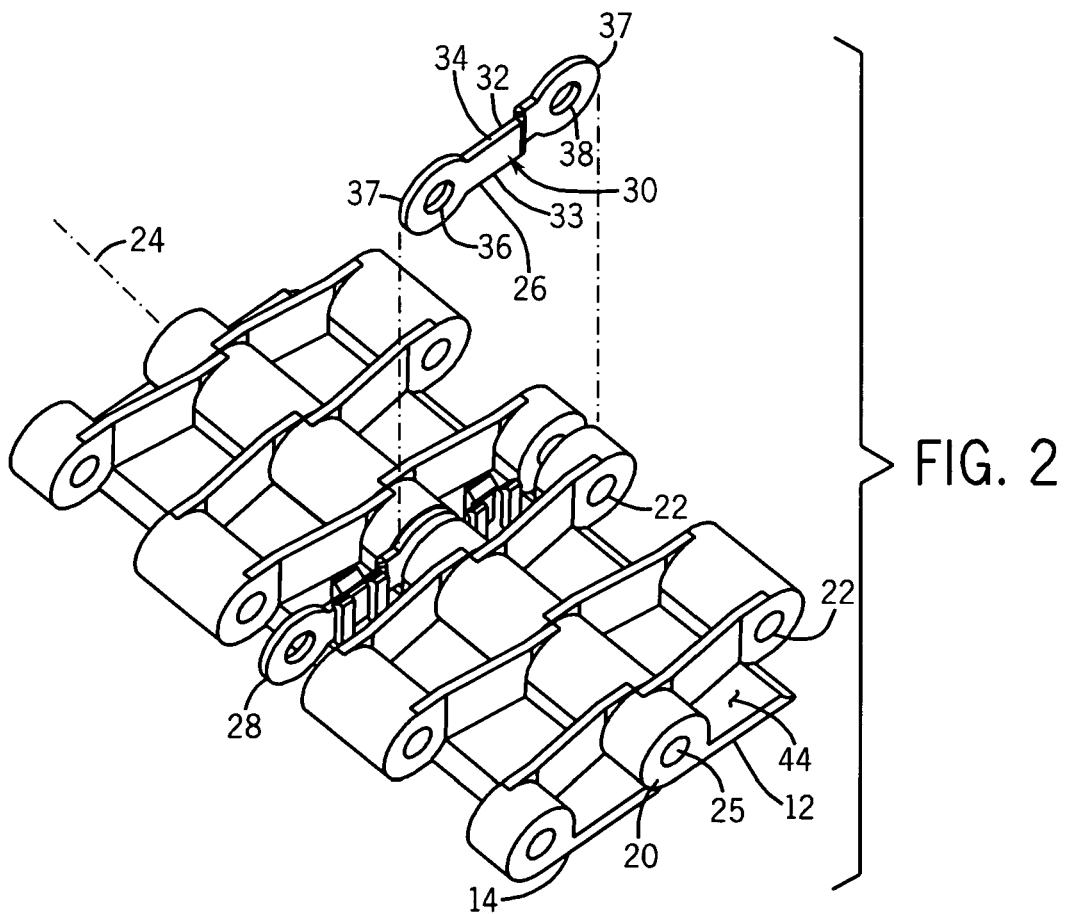
FIG. 2 is a bottom perspective view of a portion of a modular conveyor in accordance with a first embodiment.

A modular conveyor belt assembly 10 incorporating the present invention, shown in FIGS. 1 and 2, includes a plurality of adjacent modules 12, 14. The adjacent modules 12, 14 are assembled in an edge-to-edge relation to form the continuous modular conveyor belt assembly 10. A hinge pin 25 pivotally connect adjacent modules 12, 14. Reinforcement links 26 detachably fixed to the modules 12, 14 increase the belt assembly load capacity and simplify joining adjacent modules 12, 14 with the hinge pin 25.

The modules 12, 14 are preferably formed using methods known in the art, such as injection molding, from materials known in the art, such as acetal, polyethylene, polypropylene, nylon (polyamide), and the like. However, modules 12, 14 can be made from a variety of materials (e.g., steel, aluminum, carbon fiber, plastics, and the like) depending upon the ultimate application. One of ordinary skill in the art would understand and appreciate the contextual material choices.

In the embodiment disclosed herein, the modules 12, 14 are substantially identical in construction and structure. For clarity, the structure of one module will be described, with the understanding that all modules are similar. However, the modules can differ in size, shape, construction, and function without departing from the scope of the invention. The module 12 disclosed in FIGS. 1 and 2 includes a first link end 16, a second link end 18, and a width defined between a first side 27 and a second side 31. The first link end 16 extends in a first direction 17 from a leading edge 19. The second link end 18 extends in a second direction 21 from a trailing edge 23. The first link end 16 includes a first aperture 20 and a second link end 18 includes a second aperture 22. The central axis of the apertures 20, 22 are parallel with the leading edge 19 and trailing edge 23, respectively. Although the terms "leading" and "trailing" are used to identify features of the module 12, the modules 12, 14 described herein can be used in any direction or orientation without departing from the scope of the invention.

Adjacent modules 12, 14 are intermeshing. The first link end 16 of the module 12 is laterally offset from the second link end 18 to allow the second link end 18 of an adjacent module 14 to intermesh with the first link end 16 of the module 12. When first and second link ends 16, 18 of a module 12 and an adjacent module 14 mesh, a first aperture 20 of the module 12 and second aperture 22 of the adjacent module 14 are substantially collinear along a hinge axis 24 for receiving the hinge pin 25 therethrough to pivotally connect the modules 12, 14 and reinforcement links 26.

Each module 12 preferably includes at least one reinforcement link 26 pivotally connected to another reinforcement link 26 detachably fixed to the adjacent module 14. In the embodiment, shown in FIG. 2, the reinforcement link 26 has a first reinforcement link side 30 and a second reinforcement link side 32 that are in substantially parallel, spaced-apart planes. The reinforcement link sides 30, 32 are joined by a reinforcement link top 33, bottom, and ends 37. The reinforcement link 26 has a third aperture 36 and a fourth aperture 38. The reinforcement link 26 includes a knee bend at approximately two-thirds the distance from the third aperture 36 to the fourth aperture 38 which offsets the reinforcement link ends 37. The reinforcement link sides 30, 32 are offset such that the first reinforcement link side 30 on the end nearest the fourth aperture 38 is substantially coplanar with the second reinforcement link side 32 on the end nearest the third aperture 36. This allows adjacent reinforcement links 26, 28 to assemble in a linear fashion and for the modules 12, 14 to be interchangeable.

Additional reinforcement link 26, 28 configurations, such as described below, are available and one of ordinary skill in the art would recognize the various applicable reinforcement link 26, 28 geometries and configurations. The reinforcement links 26, 28 are preferably made from metals, however, other materials, such as plastics and fiber composites, may be used in appropriate circumstances.

Figure 3:
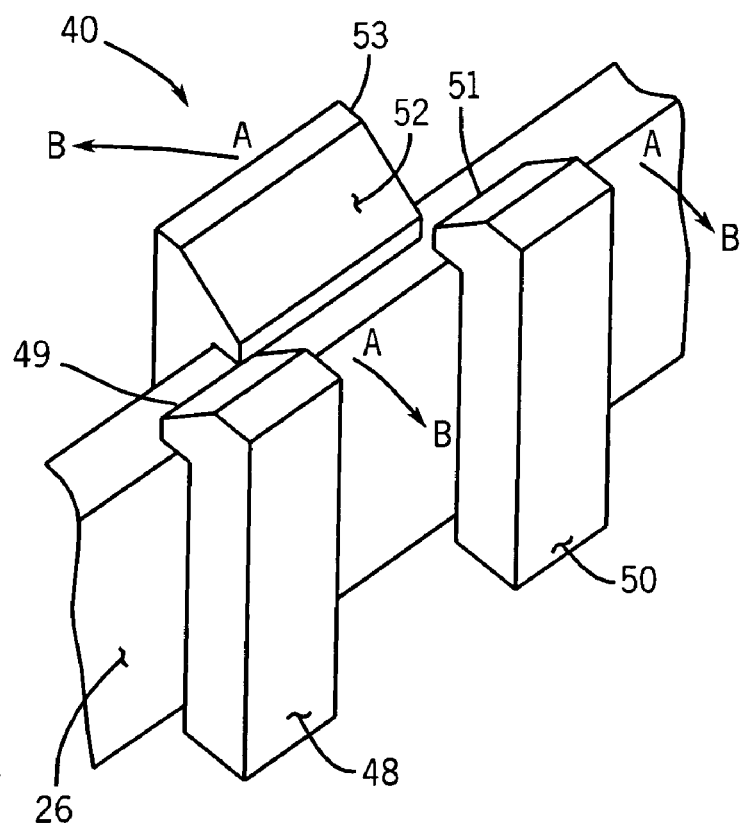
FIG. 3 is a fragmented perspective view of a portion of the modular conveyor shown in FIG. 2.

The reinforcement links 26 are detachably fixed to the modules 12, 14 to simplify pivotally connecting the modules 12, 14 with the hinge pin 25. In the embodiment shown in FIG. 3, first, second, and third resilient fingers 48, 50, 52 are employed to detachably fix the reinforcement link 26 to the module 12. The first and second resilient fingers 48, 50 are disposed on the first reinforcement link side 30 and have substantially square cross-sections. The third resilient finger 52 is disposed on the second reinforcement side 32 and has a substantially rectangular cross-section. The distal end of the first, second, and third resilient fingers 48, 50, 52 include angled heads 49, 51, 53. The angled heads 49, 51, 53 have a wedge shape that allows the reinforcement link 26 to deflect the first and second resilient fingers 48, 50 opposite to the third resilient finger 52 when inserted. The resilient fingers 48, 50, 52 deflect slightly from position A to position B to allow the reinforcement link to fit securely once it passes the wedge shaped ends. The resilient fingers 48, 50, 52 are sized to engage the reinforcement link 26. This configuration allows the reinforcement link 26 to be snapped into the resilient fingers 48, 50, 52 such that the reinforcement link 26 is retained by the wedge shaped ends of the resilient fingers 48, 50, 52.

The geometry of the reinforcement link 26 and resilient fingers 48, 50, 52 can be varied to allow selective removal of the reinforcement link 26, prevent removal of the reinforcement link 26, or provide some intermediate amount of restraint. One of ordinary skill in the art would understand the various resilient finger 48, 50, 52 combinations and geometries available to provide the desired function. Moreover, while the preferred embodiment depicts three resilient fingers 48, 50, 52, any number may be employed without departing from the scope of the invention.

Figure 4:
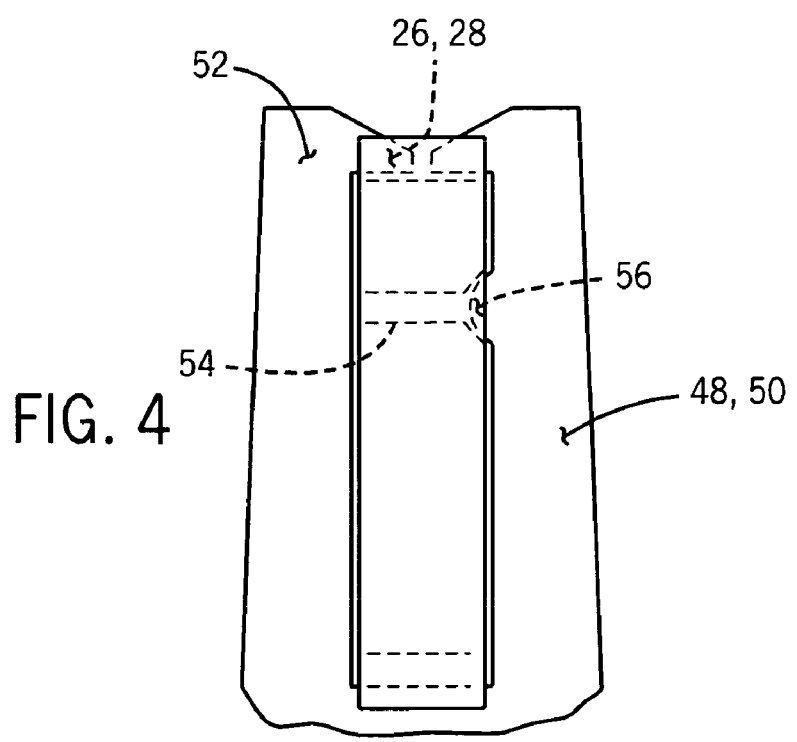
FIG. 4 is a fragmented perspective view of a portion of a modular conveyor.

The resilient fingers 48, 50, 52 of the embodiment disclosed herein are configured to restrain and align the third and fourth apertures 36, 38 of the reinforcement link 26 with the first aperture 20 and second aperture 22, respectively. The third aperture 36 is substantially coaxial with the first aperture 20 of the first link end 16 and the fourth aperture 38 is substantially coaxial with the second aperture 22 of the second link end 18 when the reinforcement link 26 is engaged with the resilient fingers 48, 50, 52. The reinforcement link 26 can be restrained by the friction force between the resilient fingers 48, 50, 52 and the reinforcement link 26. Alternatively, or in addition, as shown in FIG. 4, the reinforcement link 26 can have a recess 54 configured to engage a complementary protrusion 56 extending from one or more resilient fingers 48, 50, 52. It is of note that either the reinforcement link 26 or resilient fingers 48, 50, 52 may contain either the recess 54 or protrusion 56. Such a configuration would help prevent the reinforcement link 26 from moving out of the desired alignment. One of ordinary skill in the art will recognize the variations available to help align and restrain the reinforcement links 26, 28.

The hinge pin 25 is inserted along the hinge axis 24 substantially coaxial with the first aperture 20 of the module 12, second aperture 22 of the adjacent module 14, third aperture 36 of the reinforcement link 26 of the module 12, and the fourth aperture 38 of the reinforcement link 28 of the adjacent module 14 to pivotally connect the modules 12, 14 and adjacent reinforcement links 26. This pattern is repeated at each meshing of adjacent modules 12, 14 until the desired length of the modular conveyor belt assembly 10 is assembled.

A conveyor belt assembly 10 including a plurality of modules 12, 14 as described above and shown in FIGS. 1, 2, and 3, are assembled by axially aligning the first aperture 20 of the first link end 16 and the third aperture 36 of the reinforcement link 26, axially aligning the second aperture 22 of the second link end 18 and the fourth aperture 38 of the reinforcement link 26, and detachably fixing the reinforcement link 26 and the module 12 by urging the reinforcement link 26 between the resilient fingers 48, 50, 52. This process is repeated with the adjacent module 14 to form at least modules 12, 14 which can be easily pivotally connected.

The modules 12, 14 and adjacent reinforcement links 26, 28 are pivotally connected by axially aligning the second aperture 22 of the adjacent module 14 with the first aperture 20 of the module 12, and then inserting the first link pin 25 into the first aperture 20 of the module 12, the second aperture 22 of the first adjacent module 14, the third aperture 36 of the reinforcement link 26 and the fourth aperture 38 of the reinforcement link 28. The process is repeated until the desired length of modular conveyor belt assembly 10 is obtained.

Figure 5:
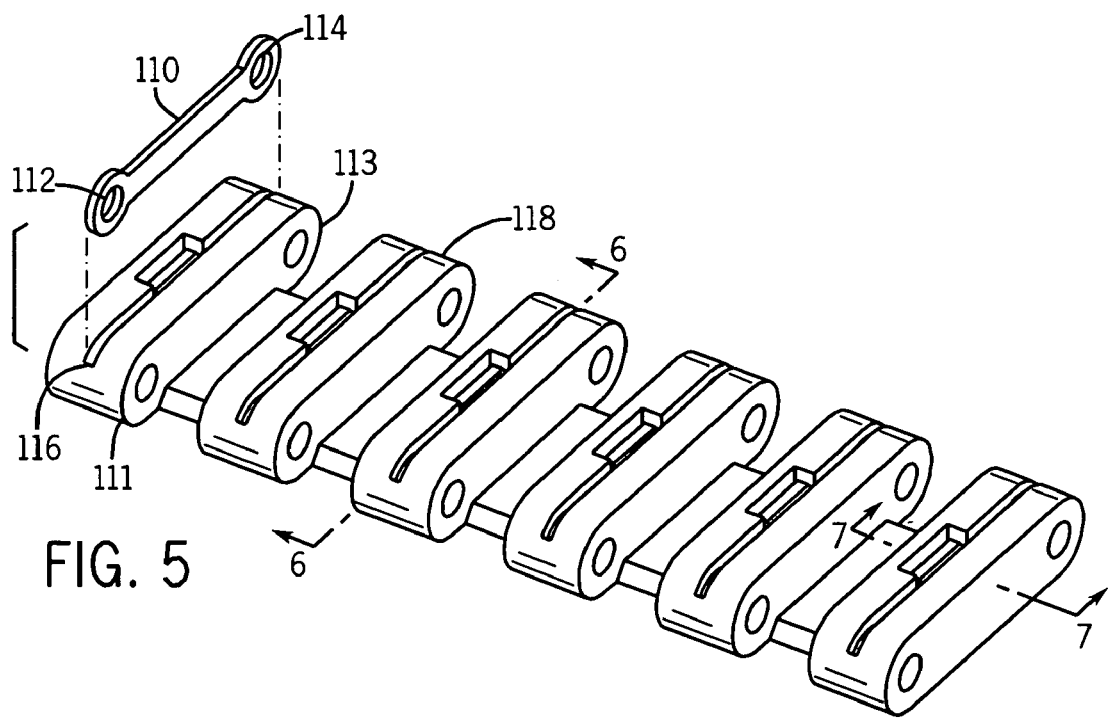
FIG. 5 is a bottom perspective view of a module in accordance with a second embodiment.

In a second embodiment of the present invention, shown in FIG. 5, a straight reinforcement link 110 comprises a substantially flat bar with a third aperture 112 and a fourth aperture 114. The straight reinforcement link 110 is inserted into a cavity 116 formed within the module 118 and extending between the link ends 111, 113.

Figure 6:
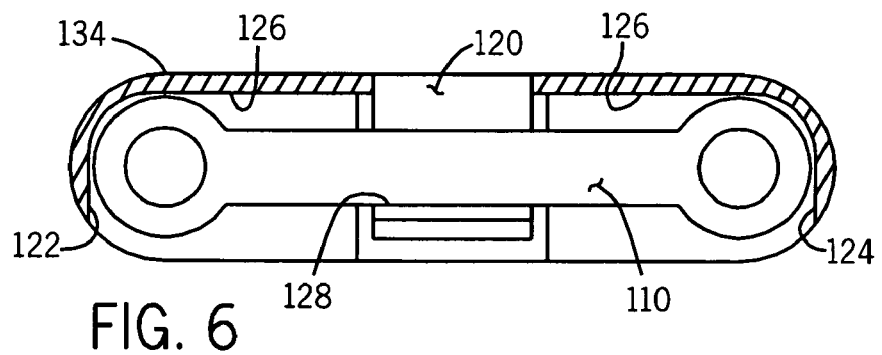
FIG. 6 is a section view along line A-A of the module shown in FIG. 5.
Figure 7:
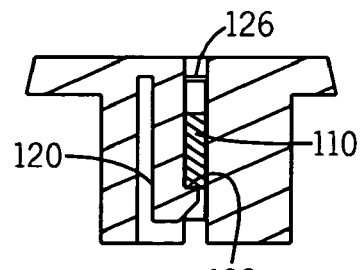
FIG. 7 is a section view along line B-B of the module shown in FIG. 5.

The cavity 116 is a substantially elongated downwardly opening slot with rounded first and second link ends 111, 113. FIG. 6 shows the detail of the cavity 116 along line A-A. In this embodiment, one resilient finger 120 located within the cavity 116 is configured to retain the straight reinforcement link 110 between the cavity 116 side walls 122, 124, top wall 126, and the wedge-shaped resilient finger end 128. FIG. 7 (Section B-B of FIG. 5) illustrates how the straight reinforcement link 110 is restrained by being confined by the cavity 116 top wall 126 and the wedge-shaped resilient finger end 128.

Figure 8:
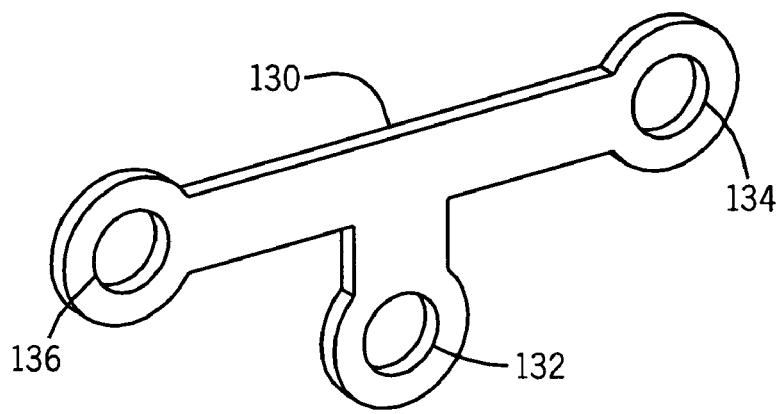
FIG. 8 is a perspective view of a reinforcement link.

FIG. 8 shows an alternate configuration of a reinforcement link 130 having a T-shape suitable for use with the module 118 shown in FIG. 5. The T-shaped reinforcement link 130 includes a third and fourth apertures 134, 136 located at the upper ends of the T-shaped reinforcement link 130. A fifth aperture 132 is located at the base of the T-shaped reinforcement link 130. The fifth aperture 132 is included to accommodate the attachment of a plurality of conveyor-belting accessories. While depicted as a T-shaped reinforcement link, one of ordinary skill in the art would appreciate the possible reinforcement link variations, such as a reinforcement link in which the fifth aperture is disposed at an angle from the line between the third and fourth apertures 134, 136.

Figure 9:
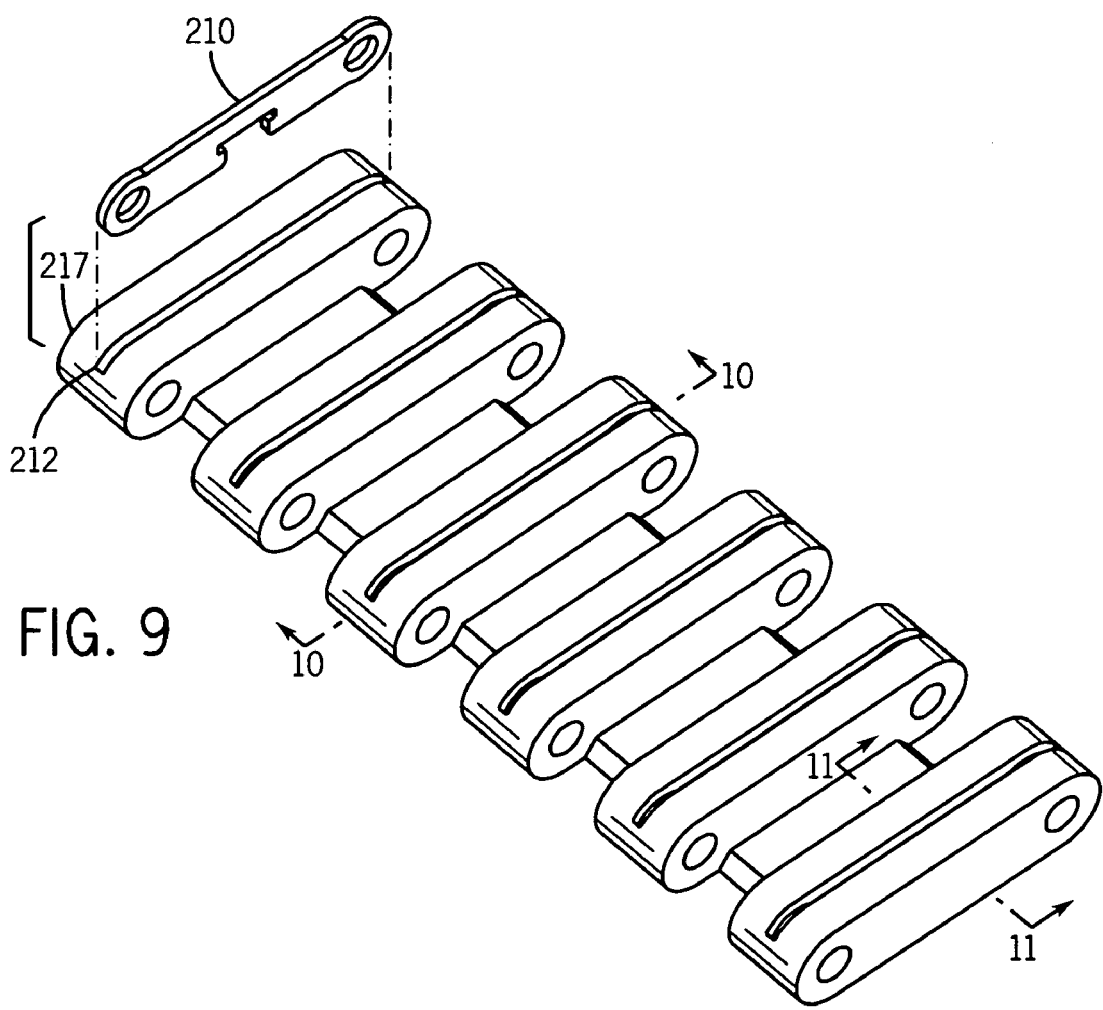
FIG. 9 is a perspective view of a module in accordance with a third embodiment.
Figure 10:
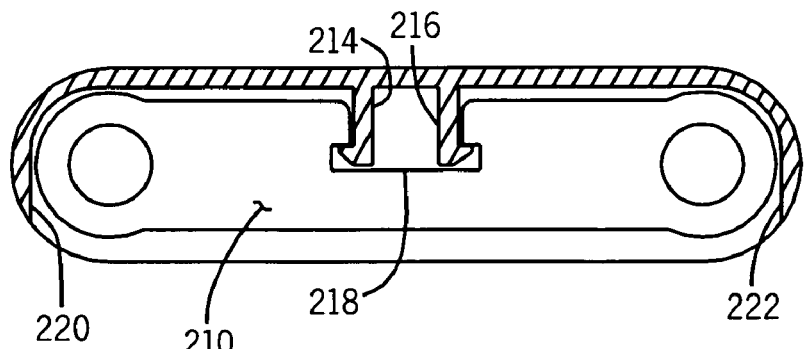
FIG. 10 is a section view along line C-C of the module shown in FIG. 9.
Figure 11:
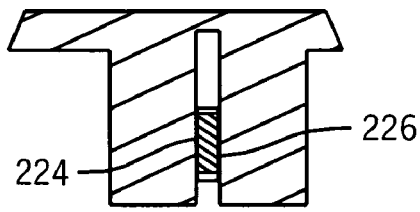
FIG. 11 is a section view along line D-D of the module shown in FIG. 9.

In a third embodiment, shown in FIG. 9, a notched reinforcement link 210 is inserted into a cavity 212 formed within the module 217. The cavity 212 includes substantially parallel offset resilient fingers 214, 216 extending substantially normal to the module 217 (shown in FIG. 10). Turning to FIG. 10, the offset resilient fingers 214, 216 are configured to engage a T-shaped notch 218 located within the notched reinforcement link 210. The notched reinforcement link 210 is primarily restrained by the offset resilient fingers 214, 216, and the cavity 212 side walls 220, 222, 224, 226 (224, 226 shown in FIG. 11).

Figure 12:
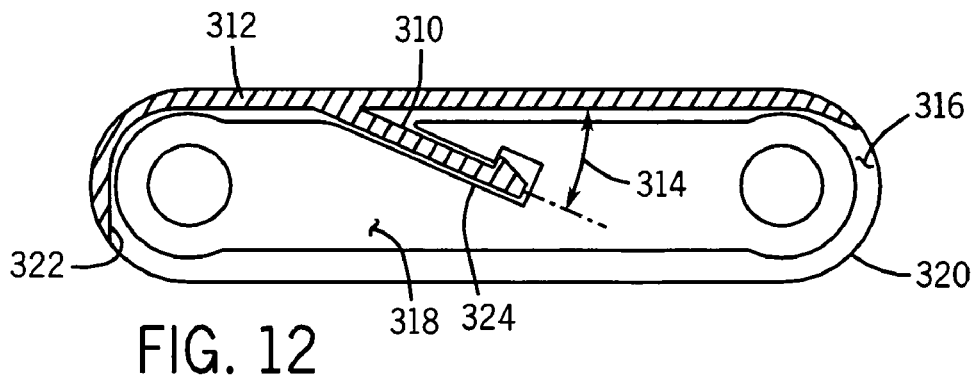
FIG. 12 is a section view of a portion of a module in accordance with a fourth embodiment.

FIG. 12 shows a section view of another cavity depicting another embodiment of the present invention. An angled resilient finger 310 extends from the module 312 at an angle 314. A complementary angled notch 324 receives the angled resilient finger 310. A slit 316 in the module 312 allows the notched reinforcement link 318 to be easily inserted from the first or second link ends 320, 322. This allows for easy installation where space or access is limited beneath the module 312.

Figure 13:
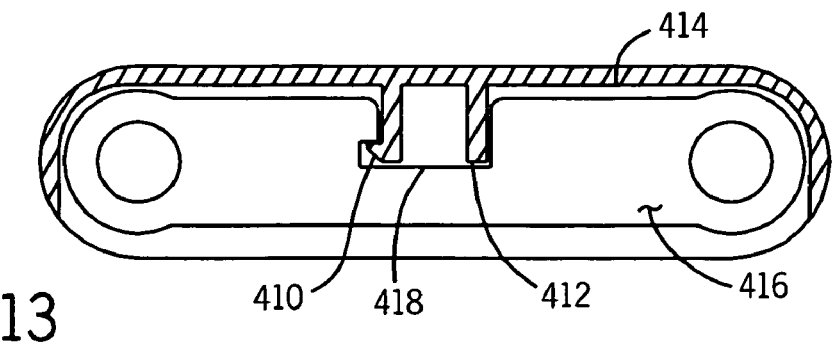
FIG. 13 is a section view of a portion of a module in accordance with a fifth embodiment.

FIG. 13 presents another various embodiment of the present invention as shown by a cross-sectional view of another cavity incorporating a resilient finger 410 and a substantially rigid finger 412 extending substantially normal to the module 414. The notched reinforcement link 416 has an L-shaped notch 418 located within the notched reinforcement link 416. As the notched reinforcement link 416 is inserted, the resilient first finger 410 flexes until it reaches the perpendicular portion of the L-shaped notch 418 within the notched reinforcement link 416. Once seated, the resilient first finger 410 rebounds to its equilibrium orientation thus fixing the notched reinforcement link 416. The substantially rigid second finger 412 helps align and maintain the notched reinforcement link 416.

It is of note that the reinforcement link 26 need not always contain the female connection, such as the notch, and the module 12, 14 contain the male connection, such as a finger, as depicted in the preferred embodiments. The reinforcement link 26 may equally be formed to contain the male connection and the module to contain the female connection.

While there has been shown and described what are at present considered the preferred embodiments of the invention, it will be obvious to those skilled in the art that various changes and modifications can be made therein without departing from the scope of the invention defined by the appended claims. For example, the belt assembly 10 can be assembled as shown in FIG. 1 having a width equal to the width of a single module 12, 14, or the belt assembly can be assembled in a brick laying fashion providing a belt assembly with a width greater than a single module 12, 14.

We claim:

1. A conveying belt module for use in a conveying assembly, said module comprising:
   a first link end extending in a first direction from a leading edge and a second link end extending in a second direction from a Wailing edge, said first link end including a first aperture for receiving a first link pin connecting said module to an adjacent module, said second link end including a second aperture for receiving a second link pin connecting said module to another adjacent module; and
   a reinforcement link detachably fixed to said module independent of said first link pin and said second link pin, said reinforcement link including a third aperture aligned with said first aperture for receiving said first link pin and a fourth aperture aligned with said second aperture for receiving said second link pin.

2. The conveying belt module of claim 1, including at least one finger detachably fixing said reinforcement link to said module.

3. The conveying belt module of claim 2, including a protrusion extending from one of said at least one finger and said reinforcement link, said protrusion engaging a recess formed in the other of said at least one finger and said reinforcement link.

4. The conveying belt module of claim 2, in said at least one finger extends normal to said module on a first side of said reinforcement link and another finger extends normal to said module on a second side of said reinforcement link to detachably fix said reinforcement link to said module.

5. The conveying belt module of claim 2, in which said at least one finger extends at an obtuse angle from said module.

6. The conveying belt module of claim 1, in which said reinforcement link includes a notch engaging said module which detachably fixes said reinforcement link to said module.

7. The conveying belt module of claim 1, further said reinforcement link is received in a cavity formed in said module.

8. The conveying belt module of claim 7, in which at least one finger disposed in said cavity engages said reinforcement link fixes said reinforcement link to said module.

9. The conveying belt module of claim 1, wherein said reinforcement link is T-shaped and includes a fifth aperture configured to accommodate at least a first conveyor-belting accessory.

10. A modular conveying assembly comprising:
a first module having a first link end extending in a first direction from a first leading edge, said first link end including a first aperture for receiving a link pin connecting said first module to a second module, and a first reinforcement link detachably fixed to said first module independently of said link pin, said first reinforcement link including a third aperture aligned with said first aperture for receiving said link pin;
said second module having a second link end extending a second direction from a second leading edge, said second link end including a second aperture for receiving said link pin connecting said first module to said second module, and a second reinforcement link detachably fixed to said second module independently of said link pin, said second reinforcement link including a fourth aperture aligned with said second aperture for receiving said link pin; and
a link pin extending through said first, second, third, and fourth apertures of said first module, said second module, said first reinforcement link, and said second reinforcement link.

11. The modular conveying assembly of claim 10, including at least one finger detachably fixing said first reinforcement link to said first module.

12. The modular conveying assembly of claim 11, including a protrusion extending from one of said at least one finger and said first reinforcement link, said protrusion engaging a recess formed in the other of said at least one finger and said first reinforcement link.

13. The modular conveying assembly of claim 11, in said at least one finger extends normal to said first module on a first side of said first reinforcement link and another finger extends normal to said first module on a second side of said first reinforcement link to detachably fix said first reinforcement link to said first module.

14. The modular conveying assembly of claim 11, in which said at least one finger extends at an obtuse angle from said first module.

15. The modular conveying assembly of claim 10, in which said first reinforcement link is received in a cavity formed in said first module.

16. The modular conveying assembly of claim 10, in which said first reinforcement link includes a notch engaging said first module which detachably fixes said first reinforcement link to said first module.

17. A method of assembling a conveyor belt comprising:
providing a module having a first link end extending in a first direction from a leading edge and a second link end extending in a second direction from a trailing edge, said first link end including a first aperture and said second link end including a second aperture, a reinforcement link including a third aperture and a fourth aperture;
axially aligning said first aperture of said first link end and said third aperture of said reinforcement link for receiving a first link pin;
axially aligning said second aperture of said second link end and said fourth aperture of said reinforcement link for receiving a second link pin; and
detachably fixing said reinforcement link to said module independent of said first and second link pins extending through said apertures.

18. The method of claim 17, in which detachably fixing said reinforcement link to said module includes engaging at least one finger extending from one of said reinforcement link and said module with the other of said reinforcement link and said module.

19. The method of claim 17, in which detachably fixing said reinforcement link to said module includes inserting said reinforcement link into a cavity formed in said module.

* * * * *

UNITED STATES PATENT AND TRADEMARK OFFICE
CERTIFICATE OF CORRECTION

PATENT NO. : 7,681,718 B2 Page 1 of 1
APPLICATION NO. : 11/611392
DATED : March 23, 2010
INVENTOR(S) : Stebnicki et al.

It is certified that error appears in the above-identified patent and that said Letters Patent is hereby corrected as shown below:

Column 6, claim 1, line 53 "Wailing" should be changed to -- trailing --

Signed and Sealed this

Twenty-second Day of June, 2010

David J. Kappos
*Director of the United States Patent and Trademark Office*